United States Patent
Cano Rodriguez et al.

(10) Patent No.: US 10,132,692 B2
(45) Date of Patent: Nov. 20, 2018

(54) TEMPERATURE SENSOR FOR BOLTED CONNECTIONS

(71) Applicant: SCHNEIDER ELECTRIC USA, INC., Schaumburg, IL (US)

(72) Inventors: Vladimir Cano Rodriguez, Apodaca (MX); Gerardo Rodriguez Najera, San Nicolas de los Garza (MX)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 232 days.

(21) Appl. No.: 15/101,204

(22) PCT Filed: Dec. 6, 2013

(86) PCT No.: PCT/US2013/073502
§ 371 (c)(1),
(2) Date: Jun. 2, 2016

(87) PCT Pub. No.: WO2015/084387
PCT Pub. Date: Jun. 11, 2015

(65) Prior Publication Data
US 2016/0299012 A1    Oct. 13, 2016

(51) Int. Cl.
*G01K 1/00* (2006.01)
*G01K 13/00* (2006.01)
(Continued)

(52) U.S. Cl.
CPC ................ *G01K 1/16* (2013.01); *G01K 1/08* (2013.01); *G01K 13/00* (2013.01)

(58) Field of Classification Search
USPC ........................................ 374/208, 152, 141
See application file for complete search history.

(56) References Cited

U.S. PATENT DOCUMENTS

| 5,319,356 A | 6/1994 | Yoshino |
| 5,877,691 A | 3/1999 | Suptitz et al. |

(Continued)

FOREIGN PATENT DOCUMENTS

| EP | 2028678 | 2/2009 |
| EP | 2350764 A1 | 7/2011 |

(Continued)

OTHER PUBLICATIONS

KR 1020110028793 Translation (Mar. 22, 2011).*
International Search Report and Written Opinion dated Apr. 18, 2014 in PCT/US2013/073502, 27 pp.

*Primary Examiner* — Mirellys Jagan
(74) *Attorney, Agent, or Firm* — Locke Lord LLP

(57) ABSTRACT

A temperature sensor 31A for bolted connections 8A, includes a thermally conductive housing 30 having a skirt portion 62 with an opening shaped to fit on a portion of a bolted connection of a bus bar. The skirt portion of the housing is configured to be in thermal contact with the bolted connection when the skirt portion is fitted on the bolted connection of the bus bar. The temperature sensor further includes a temperature transducer 70 in thermal contact with the housing. The temperature transducer is configured to sense a temperature of the housing which relates to a temperature of the bolted connection and to output signals to a data collector 1 via wireless or wireline communication.

10 Claims, 5 Drawing Sheets

(51) Int. Cl.
*G01K 1/16* (2006.01)
*G01K 1/08* (2006.01)

(56) References Cited

U.S. PATENT DOCUMENTS

| | | | |
|---|---|---|---|
| 5,892,430 | A | 4/1999 | Weisman |
| 6,135,691 | A | 10/2000 | Nadarajah et al. |
| 6,264,284 | B1 | 7/2001 | Lees |
| 6,798,209 | B2 | 9/2004 | Lavoie et al. |
| 6,839,212 | B2 * | 1/2005 | Simms ............... H02H 7/22 361/103 |
| 6,842,325 | B2 | 1/2005 | Meehleder et al. |
| 6,847,297 | B2 | 1/2005 | Lavoie et al. |
| 6,868,349 | B2 | 3/2005 | Fletcher et al. |
| 7,403,015 | B2 | 7/2008 | Carlino et al. |
| 7,417,554 | B2 | 8/2008 | Benke et al. |
| 7,436,641 | B2 | 10/2008 | Holly |
| 7,579,963 | B2 | 8/2009 | Viaro et al. |
| 8,018,097 | B2 | 9/2011 | Saito et al. |
| 8,576,082 | B2 | 11/2013 | Jones |
| 8,760,825 | B2 | 6/2014 | Erger et al. |
| 2001/0052843 | A1 | 12/2001 | Wiesman et al. |
| 2003/0053279 | A1 | 3/2003 | Meehleder et al. |
| 2004/0178875 | A1 | 9/2004 | Saito |
| 2006/0176630 | A1 | 8/2006 | Carlino et al. |
| 2006/0271314 | A1 | 11/2006 | Hayes |
| 2009/0141433 | A1 | 6/2009 | Maloney et al. |
| 2012/0086433 | A1 | 4/2012 | Cheng et al. |
| 2012/0123762 | A1 | 5/2012 | Studer et al. |
| 2012/0194344 | A1 | 8/2012 | McNamara et al. |
| 2013/0054162 | A1 | 2/2013 | Smith et al. |
| 2013/0200971 | A1 | 8/2013 | Crutcher et al. |
| 2014/0015516 | A1 | 1/2014 | Sorensen et al. |
| 2014/0062459 | A1 | 3/2014 | El-Essawy et al. |
| 2015/0002138 | A1 | 1/2015 | Fox |
| 2015/0010808 | A1 | 1/2015 | Shoji |
| 2018/0062651 | A1 * | 3/2018 | Jung ............... H03K 19/017509 |

FOREIGN PATENT DOCUMENTS

| | | |
|---|---|---|
| KR | 20110028793 A | 3/2011 |
| WO | WO2010119332 | 10/2010 |
| WO | WO2012054337 | 4/2012 |
| WO | 2014010411 A1 | 1/2014 |

* cited by examiner

TEMPERATURE SENSOR FOR BOLTED CONNECTIONS

TECHNICAL FIELD

The present disclosure is generally directed to temperature sensing of a bolted connection in electrical equipment.

BACKGROUND

A rise in the operating temperature of a power bus may indicate the presence of corrosion or a loss of integrity at mechanical junctions of the bus, potentially creating an operational failure or safety hazard. As a precaution, temperature monitoring or sensing devices, such as temperature sensors, may be installed at various locations in an electrical switchgear, including at a connection point on a power bus such as between a main bus and a feeder circuit. However, installation of temperature sensors on power buses generally requires the use of specialized tools and equipment to fasten the temperature sensors onto the power bus.

SUMMARY

The present disclosure provides a temperature sensor that can be easily installed on a bolted connection on a bus bar of a power bus or other current carrying conductors. The disclosed temperature sensor is a simple, practical, and relatively inexpensive device that is fastened without tools to a bolted connection of a bus bar. The temperature sensor includes a housing formed of a thermally conductive material, also referred to as a thermally conductive housing. The housing may be a metallic bell-shaped housing. The housing includes a skirt portion with an opening through which to fit the skirt portion onto a portion of a bolted connection of a bus bar, such as on a head of a bolt, a threaded end of a bolt, or a nut of the bolted connection. The skirt portion of the housing is in thermal contact with the bolted connection when the skirt portion is fitted onto the portion of the bolted connection of the bus bar. The temperature sensor further includes a temperature transducer in thermal contact with the housing. The temperature transducer is configured to sense a temperature of the housing relating to a temperature of the bolted connection and to provide sensor output signals corresponding to the sensed temperature.

The sensor output signals can be transmitted to a remote device, such as a data collector, via wireless communication or via wireline communication using sensor wires. The data collector may be a parasitically powered device that may provide operating power to the temperature sensor over the sensor wires.

Accordingly, the temperature sensor may not require batteries, and has minimal installation costs, minimized potential mistakes during installation, and minimal product costs.

BRIEF DESCRIPTION OF THE DRAWINGS

Exemplary embodiments of the present disclosure are depicted in the accompanying drawings that are briefly described as follows.

DETAILED DESCRIPTION OF THE EXAMPLE EMBODIMENTS

Figure 1:
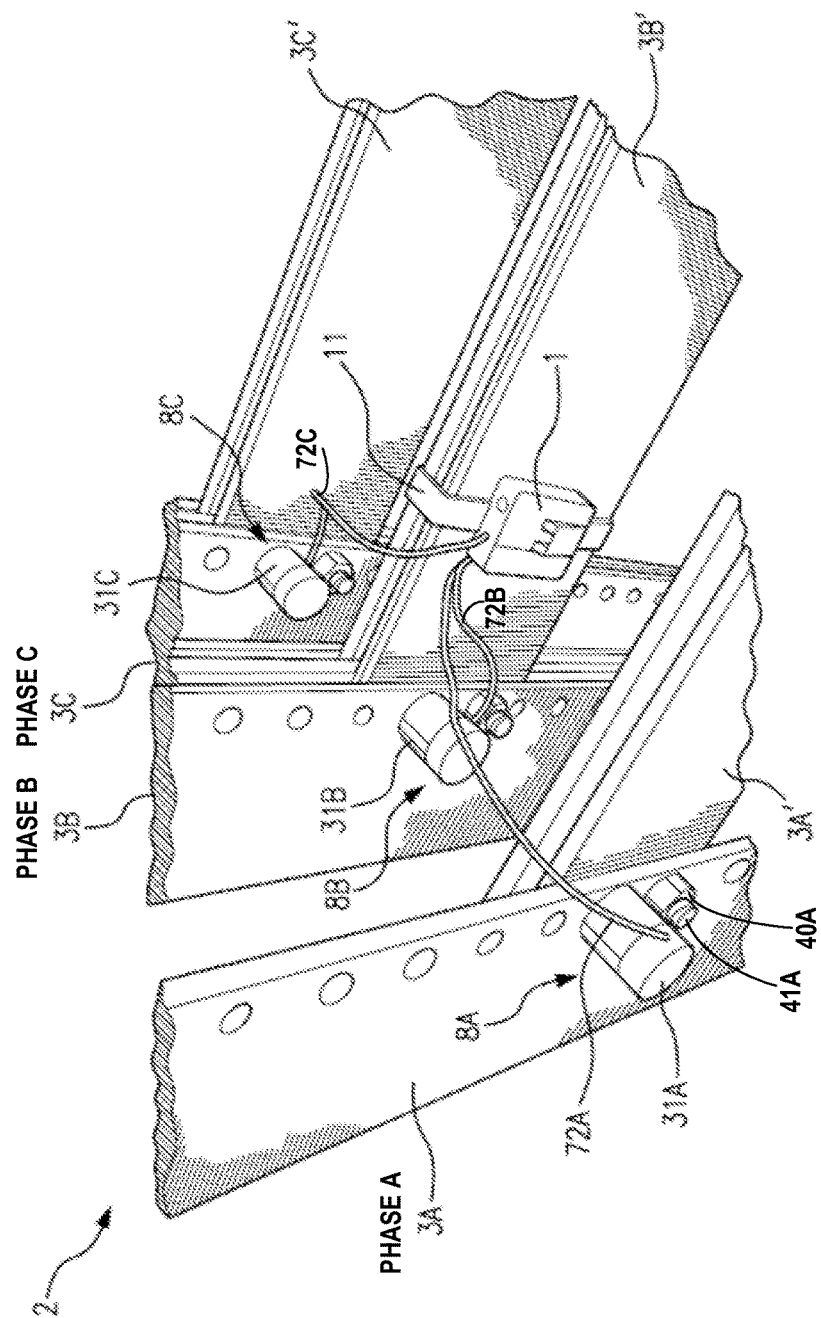
FIG. 1 illustrates an example three-phase busway, wherein a Tee-joint is formed by a bolted connection between a vertical bus bar and a horizontal bus bar in each phase. A temperature sensor has been fitted onto the bolted connection of the bus bars in each phase, to sense the temperature of the bolted connection and to provide sensor output signals corresponding to the sensed temperature.

An example temperature sensor is disclosed, which may be easily installed on a bolted connection on a bus bar of a power bus or other current carrying conductors, without the use of specialized tools and equipment. FIG. 1 illustrates an exemplary three-phase busway 2 that includes vertical bus bars 3A, 3B and 3C and horizontal bus bars 3A', 3B' and 3C' for respective phases A, B and C. Each phase of the busway 2 has a vertical bus bar connected to a horizontal bus bar using one or more bolted connections to form a Tee-joint. For example, the vertical bus bar 3A is connected to the horizontal bus bar 3A' using one or more bolted connections 8A. The vertical bus bar 3B is connected to the horizontal bus bar 3B' using one or more bolted connections 8B. The vertical bus bar 3C is connected to the horizontal bus bar 3C' using one or more bolted connections 8C. Each bolted connection 8A, 8B and 8C may include a nut and a bolt that connects bus bars together, such as a vertical bus bar and a horizontal bus bar.

As further shown in FIG. 1, temperature sensors 31A, 31B and 31C are provided to sense a temperature at the bolted connection between the vertical and horizontal bus bars 31A and 31A', 31B and 31B' and 31C and 31C, respectively. For example, the temperature sensor 31A is fitted onto a portion of one of the bolted connections 8A that connect the vertical bus bar 3A and the horizontal bus bar 3A' together. The temperature sensor 31A may, for example, be installed or secured by hand directly onto and over the nut 40A, a head of the bolt 41A or a threaded end of the bolt 41A of the bolted connection 8A. Similarly, the temperature sensor 31B is fitted onto a portion of one of the bolted connections 8B connecting the vertical bus bar 3B and the horizontal bus bar 3B' together. The temperature sensor 31C is likewise fitted onto a portion of one of the bolted connections 8C connecting the vertical bus bar 3C and the horizontal bus bar 3C' together.

Figure 3:
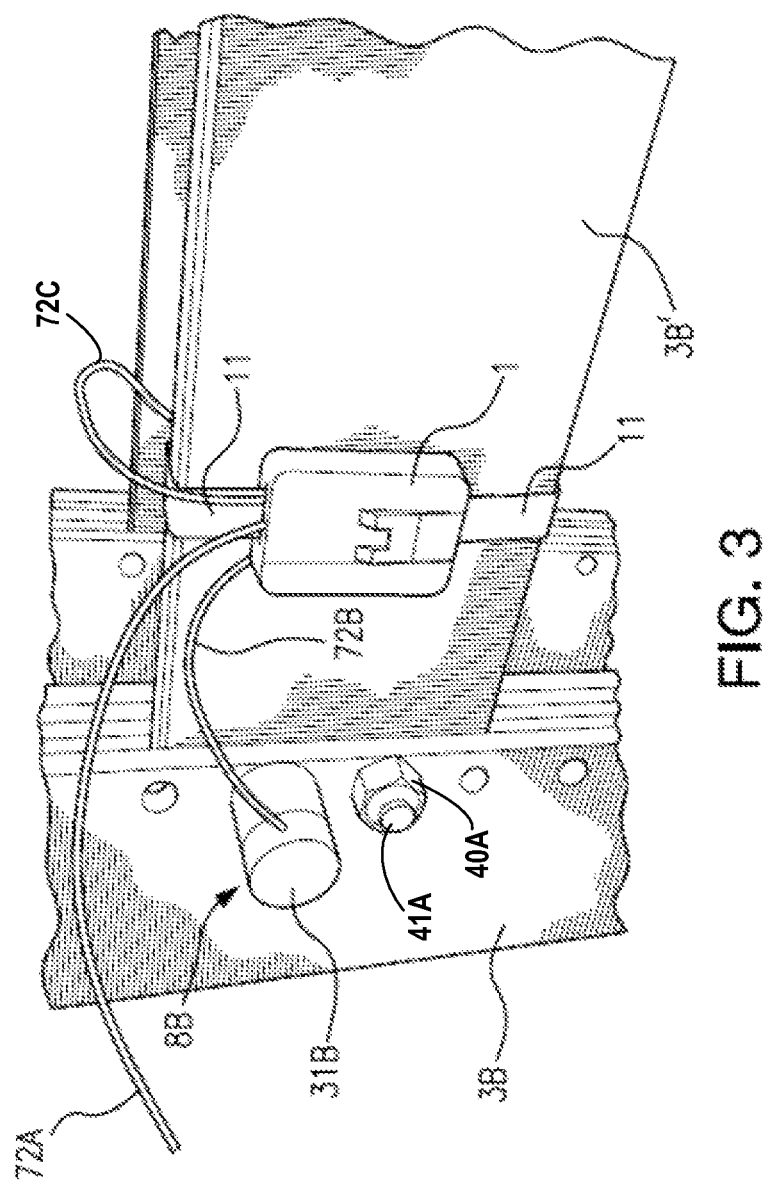
FIG. 3 illustrates an enlarged view of one phase of the busway of FIG. 1, showing the Tee-joint formed with the bolted connection between the vertical bus bar and the horizontal bus bar. The temperature sensor is shown fitted onto the bolted connection of the bus bars. The figure shows the temperature transducer outputting signals via wireless or wireline communication, to a data collector mounted on the bus bar.

The temperature sensors 31A, 31B, and 31C transmit the sensed temperature of respective bolted connections 8A, 8B and 8C, as sensor output signals, to a remote device, such as a data collector 1, via a wireless or wireline communication medium. In this example, the temperature sensors 31A, 31B and 31C conduct wireline communication over sensor wires 72A, 72B and 72C, respectively. The data collector 1 is mounted onto the horizontal bus bar 3B' using a ferromagnetic belt 11, which is used as a primary coil of a current transformer (not shown), to harvest energy from the current carrying bus bar. The harvested energy can be used to power the data collector 1 and its components, as well as to power other devices, such as sensors 31A, 31B and 31C over respective sensor wires 72A, 72B and 72C. Thus, the data collector 1 may be a parasitically powered device that may provide operating power to the temperature sensor over the sensor wires. FIG. 3 illustrates an enlarged view of the sensor 31B and the data collector 1 mounted on the bus bars of the busway 2 for the phase B. The data collector 1 is discussed in greater detail below with reference to FIG. 5. Additional details of the data collector 1 are described in the co-pending International Patent Application entitled "Wireless Batteryless Data Processing Unit", by Schneider Electric USA, Inc., International Application Number PCT/US13/71766, filed Nov. 26, 2013, which is incorporated herein by reference.

The sensed and collected temperature data of the bolted connections may be evaluated to identify problems or potential problems on the busway 2. For example, if a bolted connection was not properly torqued at the time of installation, the electrical current through the joint between the bus bars (e.g., a vertical bus bar and a horizontal bus bar) may incur a greater electrical resistance due to the poor physical connection. Over time, the bolted connection may begin to corrode and lose connection integrity, potentially creating an operational failure or safety hazard. The temperature sensors (e.g., sensors 31A, 31B and 31C) may be used to sense a rise in the operating temperature of the bolted connection, which may indicate a presence of corrosion or a loss of integrity at the mechanical junction of the bus bars.

Figure 2B:
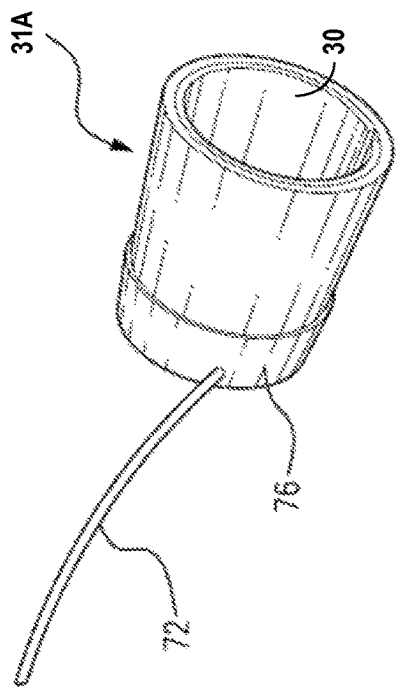
FIG. 2B illustrates the example temperature sensor of FIG. 2A, showing the plastic cover that surrounds the housing. A sensor wire is shown, to transmit sensor output signals corresponding to the sensed temperature.

For the purposes of explanation, the components and operations of the temperature sensor 31A will be discussed in detail below with reference to FIGS. 2A through 2D, as an example of the temperature sensors disclosed herein. As shown in FIG. 2A, the temperature sensor 31A includes a housing 30 formed of a thermally conductive material, such as spring steel. The housing 30 may be a metallic bell-shaped housing. The housing 30 is configured to fit onto the bolted connection, such as the bolted connection 8A of the bus bar 3A, so as to be in thermal contact with the bolted connection 8A. For example, as shown in FIG. 2C, the housing 30 includes a skirt portion 62, with an opening shaped to fit onto the nut 40A of the bolted connection 8A of the bus bar 3A. The skirt portion 62 of the housing 30 is configured to be in thermal contact with the bolted connection 8A when the skirt portion 62 is fitted on the bolted connection of the bus bar 3A. A compression spring 64, as shown in FIG. 2A, surrounds the housing 30, such as around the skirt portion 62, to compress the housing 30 against the bolted connection 8A when fitting the housing onto the bolted connection. The compression spring 64 holds the hardware firmly on the bolted connection.

Figure 2D:
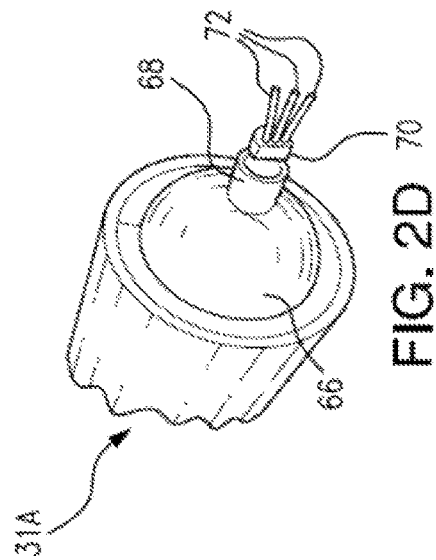
FIG. 2D illustrates the example temperature sensor of FIG. 2C, showing the temperature transducer in thermal contact with the housing. The temperature transducer is configured to sense the temperature of the housing which relates to the temperature of the bolted connection. The temperature transducer outputs signals to a data collector via wireless or wireline communication.
Figure 2A:
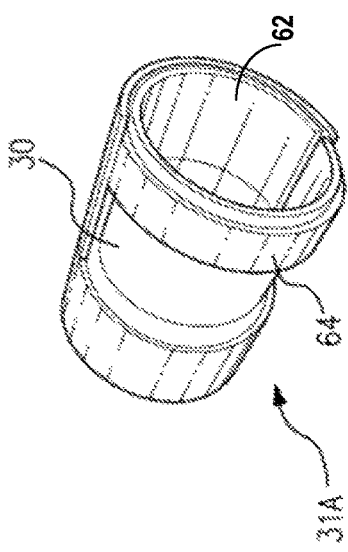
FIG. 2A illustrates an example temperature sensor that includes a housing formed of a thermally conductive material. The housing is configured to fit onto the bolted connection of the bus bar so as to be in thermal contact with the bolted connection. A compression spring surrounds the housing to compress the housing against the bolted connection when fitting the housing onto the bolted connection.
Figure 2C:
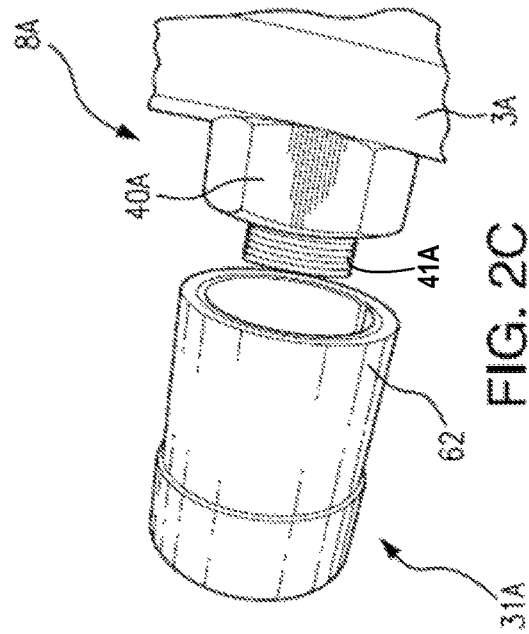
FIG. 2C illustrates the example temperature sensor of FIG. 2B, showing the skirt portion of the housing, with an opening shaped to fit onto the bolted connection of the bus bar. The skirt portion of the housing is configured to be in thermal contact with the bolted connection when the skirt portion is fitted on the bolted connection of the bus bar.

The temperature sensor 31A also includes a temperature transducer 70 in thermal contact with a dome 66 of the housing 30, as shown in FIG. 2D. The temperature transducer 70 is configured to sense the temperature of the housing 30, which relates to the temperature of the bolted connection 8A. The temperature transducer 70 outputs signals to a data collector 1 of FIG. 1, via wireless or wireline communication.

As shown in FIG. 2B, the temperature sensor 31A may also include a plastic cover 76 that surrounds the housing 30 to provide electrical insulation to the metallic parts that will be at electric potential levels. The sensor wires 72A is shown extending from the bottom of the plastic cover 76. As previously discussed, the sensor wires 72A may be used to transmit sensor output signals corresponding to the sensed temperature to the data collector 1, as well as to receive operating power from the data collector 1.

The temperature sensor 31A performs temperature measurements on any bolt or nut hardware used in electric power connections. The temperature sensor 31A may be applied to any electrical device that requires mechanical connections for the electrical conductors. The temperature on the connections can be measured to predict whether the mechanical joints of the electrical conductors maintain their integrity as they age.

Figure 4:
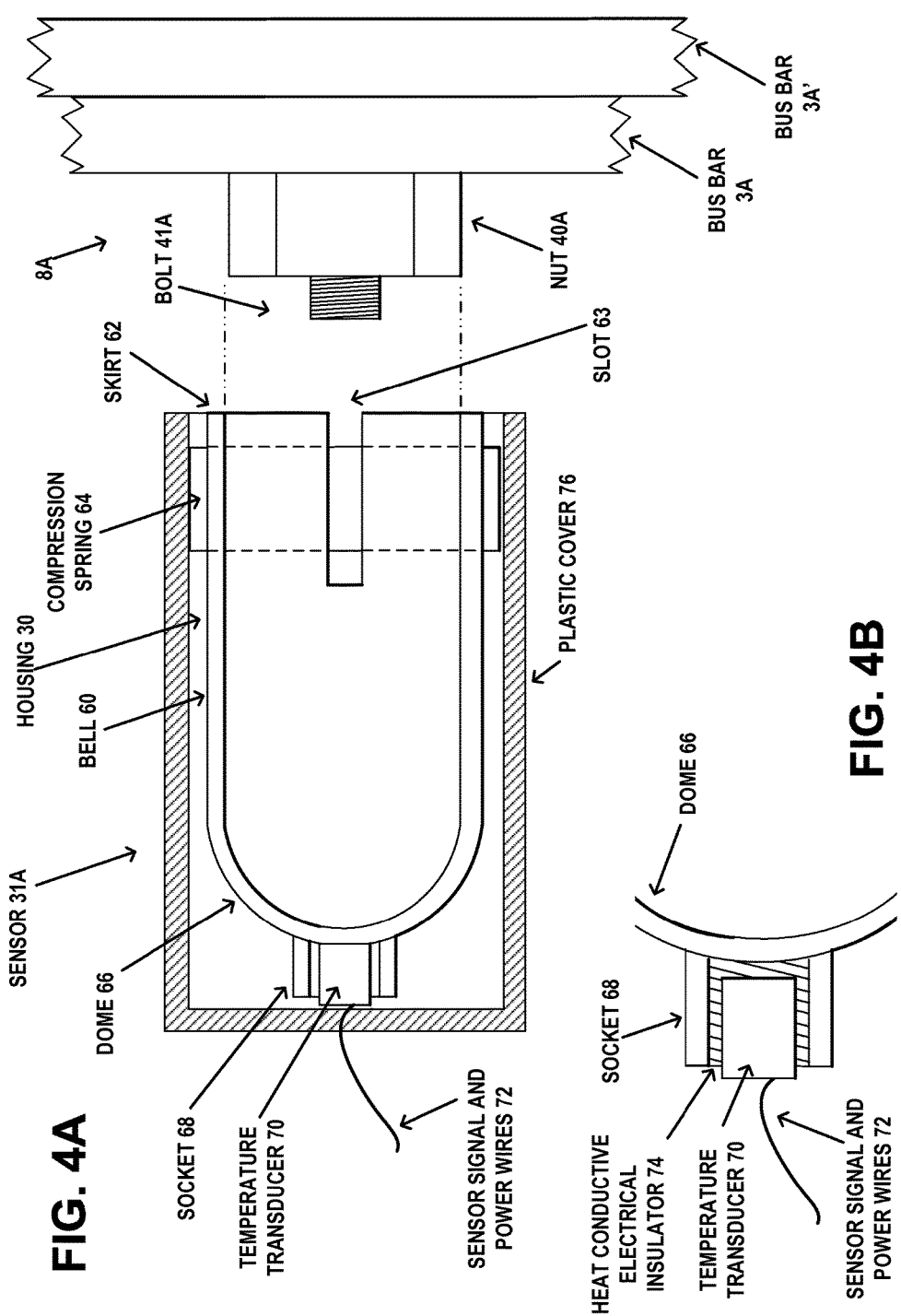
FIG. 4A illustrates an example embodiment of the temperature sensor with the temperature transducer directly mounted on the dome of the housing, to maintain thermal contact between the housing and the temperature transducer.
FIG. 4B illustrates an enlarged view of a portion of the temperature sensor of FIG. 4A wherein a heat conductive electrical insulator is interposed between the dome of the housing and the temperature transducer. The heat conductive electrical insulator is configured to maintain thermal contact between the housing and the temperature transducer while electrically insulating the temperature transducer from the housing.

FIG. 4A illustrates an example embodiment of the temperature sensor 31A with the temperature transducer 70 directly mounted on the dome 66 of the housing 30, to maintain thermal contact between the housing 30 and the temperature transducer 70. Internally, the temperature sensor 31A is basically a metallic bell 60 with some vertical cuts forming one or more slots 63 in order to allow expansion or contraction of the diameter of the bell 60. The diameter of the skirt 62 may be designed according to the size of the standard nuts and bolts available in the market and commonly used in the mechanical connections of the electrical conductors. Over the skirt 62 is the metallic compression spring 64, which may be shaped in a ring. The spring 64 is designed to apply compression force on the walls of the metallic skirt 62. At the top of the metallic bell 60 is the dome 66. The temperature transducer 70 is maintained in thermal contact with the dome 66, so that heat of the bell 60 is well transferred to the transducer 70.

FIG. 4B illustrates an example embodiment of the temperature sensor 31A, wherein a heat conductive electrical insulator 74 is interposed between the dome 66 of the housing 30 and the temperature transducer 70. The heat conductive electrical insulator 74 is configured to maintain thermal contact between the housing 30 and the temperature transducer 70, while electrically insulating the temperature transducer 70 from the housing 30. The heat conductive electrical insulator 74 may be composed of epoxy, glass, or a ceramic material, for example.

No tools are required for the installation of the temperature sensor. The sensor may be installed on the nut or bolt by applying enough pressure to ensure the metallic bell of the housing is properly attached to the nut or bolt. Due to the thermal properties of the metals, the heat of the electrical bus bars will be transferred to the nut or bolt and at the same time from the nut or bolt to the temperature sensor.

Figure 5:
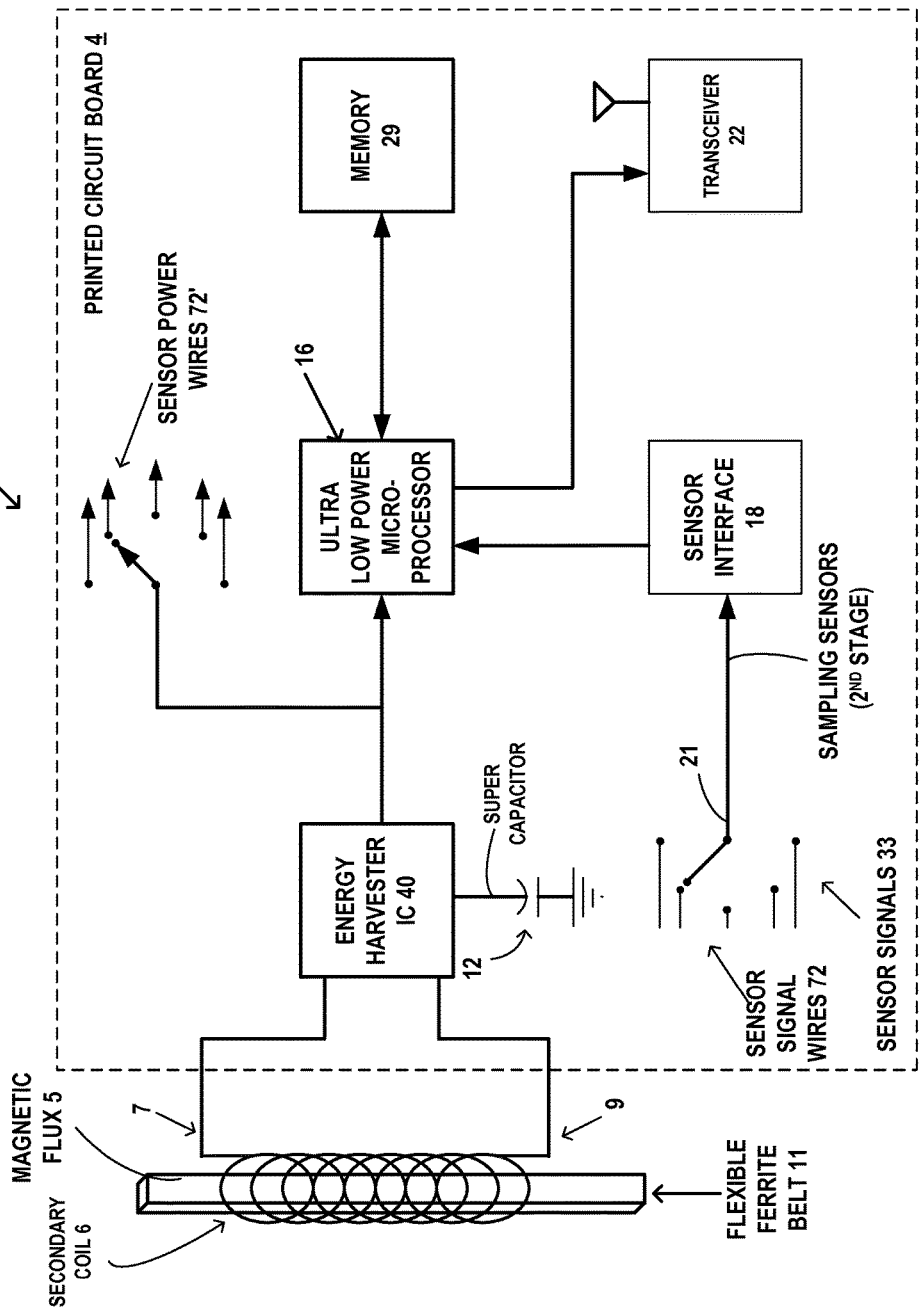
FIG. 5 illustrates an example embodiment of the data collector of FIG. 3. The temperature transducer of the temperature sensor transmits the sensor output signals to a data collector and receives operating power from the data collector.

FIG. 5 illustrates an example embodiment of the data collector 1 of FIGS. 1 and 3. The temperature transducer 70 of the temperature sensor 31A, transmits the sensor output signals 33 to the data collector 1 and receives operating power from the data collector 1 over sensor power wires 72'. The data collector 1 does not require a battery for its operation. In this example, the printed circuit board 4 of the data collector 1 may include an energy harvesting circuit 40, a data processing device such as a micro-processor 16 (in communication with a memory 29), a sensor interface 18 to collect data from one or more sensors 31A, 31B, and 31C (see e.g., FIG. 1), and a wireless transceiver 22. The sensor interface 18 is configured to receive sensor signals 33 (also referred to as "sensor inputs") at node 21, from one or more sensors such as temperature sensors 31A, 31B, and 31C or other sensors. The sensor interface 18 is configured to provide the received sensor signals to the micro-processor 16. There may be two wires 72 and 72' connected to the transducer 70 of each of the sensor(s). The sensor wire 72, such as sensor wires 72A, 72B, and 72C of FIG. 1, transmits the sensor output signals from the temperature transducer 70 to a data collector 1. A sensor power wire 72' may provide operational power to the temperature transducer 70 from the data collector 1. The data collector 1 may receive sensor signals 33 over a communications medium such as an electrical wire medium, an optical fiber medium, or a wireless radio frequency medium. In example embodiments of the invention, the energy requirements of the micro-processor 16, memory 29, wireless transmitter 22, sensor interface 18 and encoder 20 may be sufficiently low to be continuously supplied by the energy harvesting circuit 40.

In example embodiments of the invention, the sensor signals 33 may represent measurements of a physical condition of an electrical device, the physical condition being, e.g., temperature, humidity, vibration, or noise. In example embodiments of the invention, the sensor signals 33 may represent measurements of the temperature or vibration of the current carrying conductor, such as vertical or horizontal buses of the busway 2.

Although specific example embodiments of the invention have been disclosed, persons of skill in the art will appreciate that changes may be made to the details described for the specific example embodiments, without departing from the spirit and the scope of the invention.

The invention claimed is:

1. A temperature sensor for monitoring a temperature of a bolted connection of a bus bar, comprising:
a thermally conductive metallic housing having a metallic skirt portion with an opening through which to fit the skirt portion onto a portion of a bolted connection of a bus bar, the skirt portion of the housing being configured to be in thermal contact with the bolted connection when the skirt portion is fitted on the portion of the bolted connection of the bus bar; and
a temperature transducer mounted externally on the metallic housing and in thermal contact with the housing, the temperature transducer configured to sense a temperature of the metallic housing relating to a temperature of the bolted connection and to provide sensor output signals on sensor wires externally connected to the temperature transducer, corresponding to the sensed temperature.

2. The temperature sensor of claim 1, further comprising a sensor wire coupled to the temperature transducer and configured to transmit the sensor output signals to a data collector.

3. The temperature sensor of claim 1, wherein the temperature transducer is mounted on the housing, to maintain thermal contact between the housing and the temperature transducer.

4. The temperature sensor of claim 1, further comprising:
a heat conductive electrical insulator interposed between the housing and the temperature transducer, the heat conductive electrical insulator being configured to maintain thermal contact between the housing and the temperature transducer while electrically insulating the temperature transducer from the housing.

5. The temperature sensor of claim 1, further comprising:
a plastic cover surrounding the housing.

6. The temperature sensor of claim 1, wherein the sensor output signals are transmitted to a remote device over a communications medium selected from one of an electrical wire medium, an optical fiber medium, or a wireless radio frequency medium.

7. The temperature sensor of claim 1, wherein the housing is a bell-shaped housing.

8. The temperature sensor of claim 1, further comprising a sensor power wire coupled to the temperature transducer and configured to provide operational power to the temperature transducer from a data collector.

9. The temperature sensor of claim 1, further comprising:
a compression spring surrounding the skirt portion of the housing and configured to compress the skirt portion against the portion of the bolted connection when fitting the skirt portion onto the portion of the bolted connection.

10. The temperature sensor of claim 9, wherein the skirt portion includes a slot that allows the skirt portion to bend inwardly and reduce a diameter of the skirt portion when compressed via the compression spring.

* * * * *